United States Patent [19]

Sumihara et al.

[11] Patent Number: 5,059,849
[45] Date of Patent: Oct. 22, 1991

[54] ULTRASONIC MOTOR

[75] Inventors: Masanori Sumihara, Moriguchi; Yoshinobu Imasaka, Higashiosaka; Hiroshi Yoneno, Shiki, all of Japan

[73] Assignee: Matsushita Electrical Industrial Co., Ltd., Kadoma, Japan

[21] Appl. No.: 527,857

[22] Filed: May 24, 1990

Related U.S. Application Data

[63] Continuation of Ser. No. 274,967, Nov. 22, 1988, Pat. No. 4,963,781.

[30] Foreign Application Priority Data

| Nov. 26, 1987 | [JP] | Japan | 62-298951 |
| Nov. 26, 1987 | [JP] | Japan | 62-298952 |
| Nov. 26, 1987 | [JP] | Japan | 62-298953 |
| Mar. 15, 1988 | [JP] | Japan | 63-60996 |

[51] Int. Cl.$^5$ .............................. H01L 41/08
[52] U.S. Cl. ................................. 310/323
[58] Field of Search .................... 310/323, 328

[56] References Cited

U.S. PATENT DOCUMENTS

| 4,484,099 | 11/1984 | Kawai et al. | 310/323 |
| 4,495,432 | 1/1985 | Katsuma et al. | 310/323 |
| 4,562,373 | 12/1985 | Tokusima et al. | 310/323 |
| 4,634,916 | 1/1987 | Okada et al. | 310/323 |
| 4,739,212 | 4/1988 | Imasaka et al. | 310/328 |
| 4,939,404 | 7/1990 | Inagaki et al. | 310/323 |
| 4,963,781 | 10/1990 | Sumihara et al. | 310/328 |

FOREIGN PATENT DOCUMENTS

| 0209865 | 1/1987 | European Pat. Off. | 310/323 |
| 0222394 | 5/1987 | European Pat. Off. | 310/323 |
| 0022479 | 2/1985 | Japan | 310/323 |
| 62-023379 | 1/1987 | Japan | 310/323 |
| 00058887 | 3/1987 | Japan | 310/323 |
| 62-058888 | 3/1987 | Japan | 310/323 |
| 62-114480 | 5/1987 | Japan | 310/323 |
| 0147978 | 7/1987 | Japan | 310/323 |
| 0147979 | 7/1987 | Japan | 310/323 |

Primary Examiner—Mark O. Budd
Attorney, Agent, or Firm—Cushman, Darby & Cushman

[57] ABSTRACT

In an ultrasonic motor using a friction member having arrangements of reinforcing fibers between an driven member to be driven and a vibrating stator for generating travelling waves by the vibration of a piezoelectric element, the arrangements of the fibers are oriented in at least a predetermined direciton, such as parallel to the moving direction of the driven member.

2 Claims, 8 Drawing Sheets

ULTRASONIC MOTOR

This is a continuation of application Ser. No. 07/274,967 filed Nov. 22, 1988, now U.S. Pat. No. 4,963,781 issued Oct. 16, 1990.

FIELD OF THE INVENTION AND RELATED ART STATEMENT

1. FIELD OF THE INVENTION

The present invention relates to an ultrasonic motor which is driven by ultrasonic vibration generated by piezoelectric element.

2. DESCRIPTION OF THE RELATED ART

As a typical ultrasonic motor, an assemble is known that an object (driven member) to be driven is pressed to a vibrating stator, wherein the vibrating stator generates travelling waves from vibration of a piezoelectric element. In such an ultrasonic motor, the driven member is driven by frictional force generated between the driven member and the vibrating stator under the condition of the frictional contact. Accordingly, the condition of the frictional contact of the driven member and the vibrating stator is an important factor for deciding characteristics of the ultrasonic motor, such as output power, energy conversion efficiency, lifetime and so on.

In a conventional ultrasonic motor, a friction member called as slider having large friction coefficient, is provided between the driven member and the vibrating stator so as to reduce the wear of frictional contacting surfaces of the driven member and the vibration stator, and to get high output power of the ultrasonic motor. For such a friction member, hard rubber, plastics or the like is proposed to be usable by U.S. Pat. No. 4,484,099, U.S. Pat. No. 4,562,373, U.S. Pat. No. 4,634,916 or U.S. Pat. No. 4,495,432.

However, when a material on the market such as hard rubber having a large friction coefficient is used as a friction member of the conventional ultrasonic motor, which uses frictional force between the driven member and the vibration stator under a pressurized condition, the friction member was worn out quickly. When the wear of the friction member proceeds, the condition of the frictional contact of the driven member and the vibrating stator changes. Therefore, the disadvantage of the conventional ultrasonic motor are that starting torque of the motor is reduced, rotational speed falls and the lifetime of the motor becomes shorter.

In order to improve the lifetime of the motor by reducing the wear of the friction member, it has been proposed to use inorganic filler having were resistance in the friction member. However, in this case, the surface of the vibrating stator becomes uneven when the motor is driven because the filler damages the surface of the vibrating stator. When this occurs, the frictional contact of the driven member and the vibrating stator changes as time passes, and the re-starting characteristic of the motor is badly affected. This technique also has a disadvantage because stable motor characteristics cannot be achieved.

Furthermore, acoustic noise occurs when the conventional ultrasonic motor is driven because frictional contact cannot be uniformly maintained.

OBJECT AND SUMMARY OF THE INVENTION

The object of the present invention is to provide an improved ultrasonic motor having uniform frictional contact between the driven member and the vibrating stator after a long time of service, stable motor characteristics, high resistivity to wear, and low acoustic noise.

In order to achieve the above-mentioned object, an ultrasonic motor in accordance with the present invention comprises:

a piezoelectric element;

a vibrating stator provided on the piezoelectric element for generating travelling waves;

a driven member; and a friction member disposed between the vibrating stator and the driven member, and having reinforcing fibers arranged in at least a predetermined direction.

BRIEF DESCRIPTION OF THE DRAWINGS

While the novel features of the invention are set forth particularly in the appended claims, the invention, both as to organization and content, will be better understood and appreciated, along with other object and features thereof, from the following detailed description taken in conjunction with the drawings.

FIGS. 2 2(a), 2(b), 2(c), 2(d) and 2(e) are respectively perspective views showing preferred embodiments of friction member of the ultrasonic motor in accordance with the present invention.

DESCRIPTION OF THE PREFERRED EMBODIMENTS

A preferred embodiment of an ultrasonic motor in accordance with the present invention is described in the following.

Figure 1:
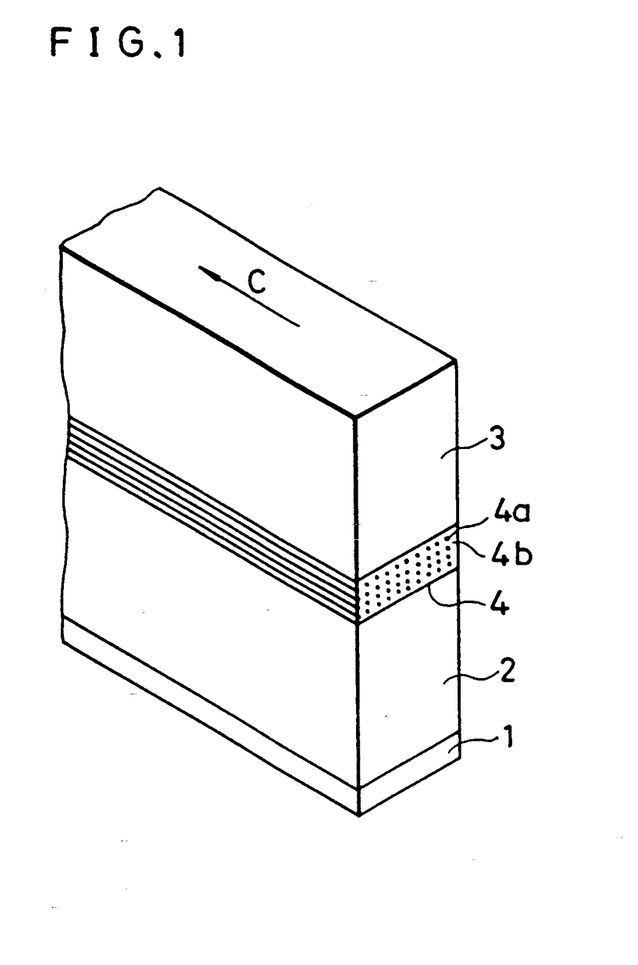
FIG. 1 is a perspective view showing a constitution of main part of a preferred embodiment of an ultrasonic motor in accordance with the present invention.

FIG. 1 is a perspective view showing a constitution of main part of a preferred embodiment of an ultrasonic motor in accordance with the present invention. In FIG. 1, numeral 1 designates a piezoelectric element. A vibrating stator 2 is bonded on a surface of the piezoelectric element 1 by using an adhesive. And numeral 3 designates a driven member which is to be driven. A friction member 4 having at least an arrangement of reinforcing fibers 4a in at least one predetermined direction against the moving direction of the driven member 3 shown by arrow C, is disposed between the driven member 3 and the vibrating stator 2. Furthermore, by pressing the vibrating stator 2 and the driven member 3, the vibrating stator 2 contacts the friction member 4 being supplied with a pressure.

When alternating electric field having frequency near to the resonant frequency of the vibrating stator 2 is applied to the piezoelectric element 1, travelling waves of bending vibration occurs in the vibrating stator 2. The friction member 4 which contacts a surface of the vibrating stator 2 being supplyed with the pressure is driven with the driven member 3 in one piece by frictional force between the vibrating stator 2 and the friction member 4. When electric power is not supplied to the piezoelectric element 1, holding torque or braking torque corresponding to the product of the pressure acting between the vibrating stator 2 and the friction member 4 and the friction coefficient therebetween occurs on the contacting surface of the vibrating stator 2 and the friction member 4.

FIGS. 2(a), 2(b), 2(c), 2(d) and 2(e) are respectively perspective views showing preferred embodiments of the friction member of the ultrasonic motor in accordance with the present invention.

Figure 2A:
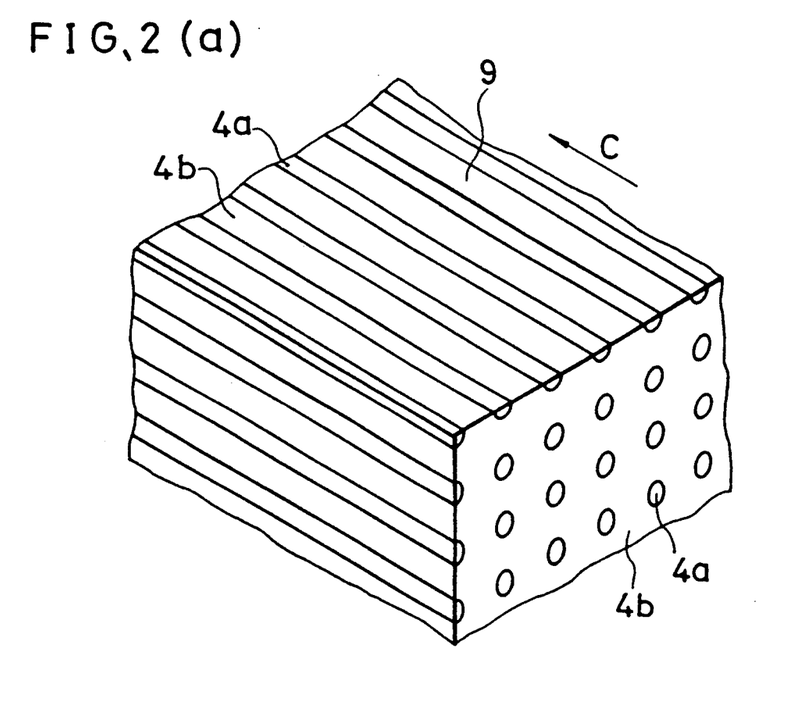

FIG. 2(a) shows a preferred embodiment of the constitution of the friction member 4 wherein the reinforcing fibers 4a are arranged in a direction substantially equal to the moving direction of the driven member 3 shown by arrow C. When the ultrasonic motor using such a friction member shown in FIG. 2(a) is driven, especially in respect of the friction between the reinforcing fibers in the friction member and the vibrating stator, the vibrating stator 2 contacts only at sectional surfaces of the reinforcing fibers 4a arranged in the direction parallel to the moving direction of the driven member 3 shown by arrow C on the contacting surface 9. That is, the reinforcing fibers 4a in the friction member 4 are arranged substantially parallel to a direction of the frictional force acting to the friction member 4.

Figure 2B:
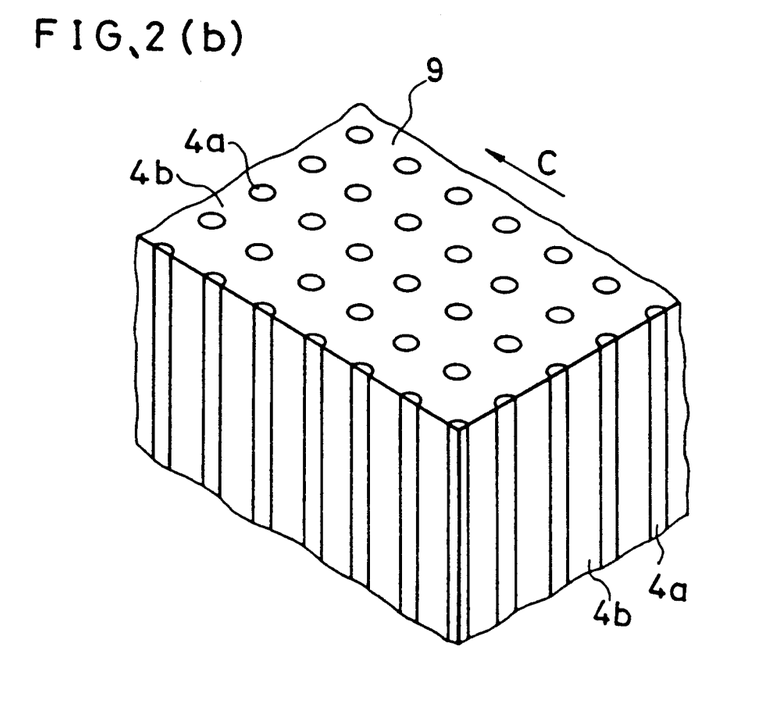

FIG. 2(b) shows another preferred embodiment of the constitution of the friction member 4 wherein the reinforcing fibers 4a are arranged in a direction substantially vertical to the moving direction of the driving member 3 shown by arrow C, and circular sections of the reinforcing fibers 4a in a direction vertical to the axes thereof are exposed on a surface 9 of the friction member 4. When the ultrasonic motor using the friction member shown in FIG. 2(b) is driven, especially in respect of the friction between the reinforcing fibers in the friction member and the vibrating stator, the vibrating stator 2 contacts only at circular sections of the reinforcing fibers 4a vertical to the axis thereof. That is, the reinforcing fibers 4a in the friction member 4 are arranged vertical to the direction of the frictional force acting to the friction member 4.

Figure 2C:
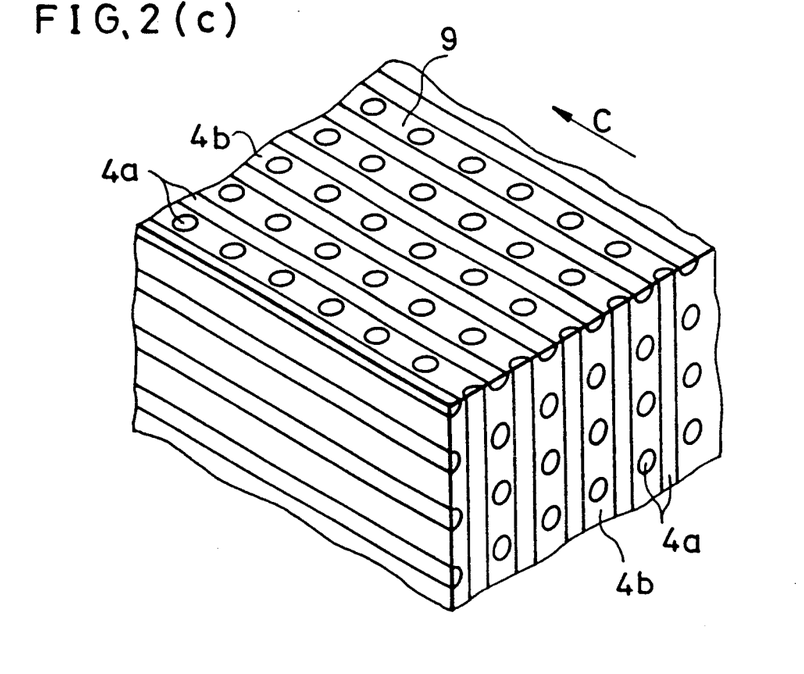

FIG. 2(c) shows still other preferred embodiment of the constitution of the friction member 4 having a feature of incorporation of the features shown in FIGS. 2(a) and 2(b). Namely, the friction member 4 contains two sets of arrangements of the reinforcing fibers 4a. One set of arrangement of the reinforcing fibers 4a is arranged parallel to the moving direction of the driven member 3 shown by arrow C. And another set of arrangement of the reinforcing fibers 4a is arranged vertical to the moving direction of the driven member 3 and the circular section of the fibers 4a vertical to axes thereof are exposed on the surface 9 of the friction member 4. When the ultrasonic motor using the friction member 4 shown in FIG. 2(c) is driven, especially in respect of the friction between the reinforcing fibers in the friction member and the vibrating stator, the vibrating stator contacts at sectional surfaces of the reinforcing fibers 4a parallel to the moving direction of the driven member 3 and at circular sections of the reinforcing fibers 4a vertical to the axes thereof. That is, arrangements of the reinforcing fibers 4a in the friction member 4 are arranged parallel to each other and vertical to the direction of the frictional force acting to the frictional material 4.

Figure 2D:
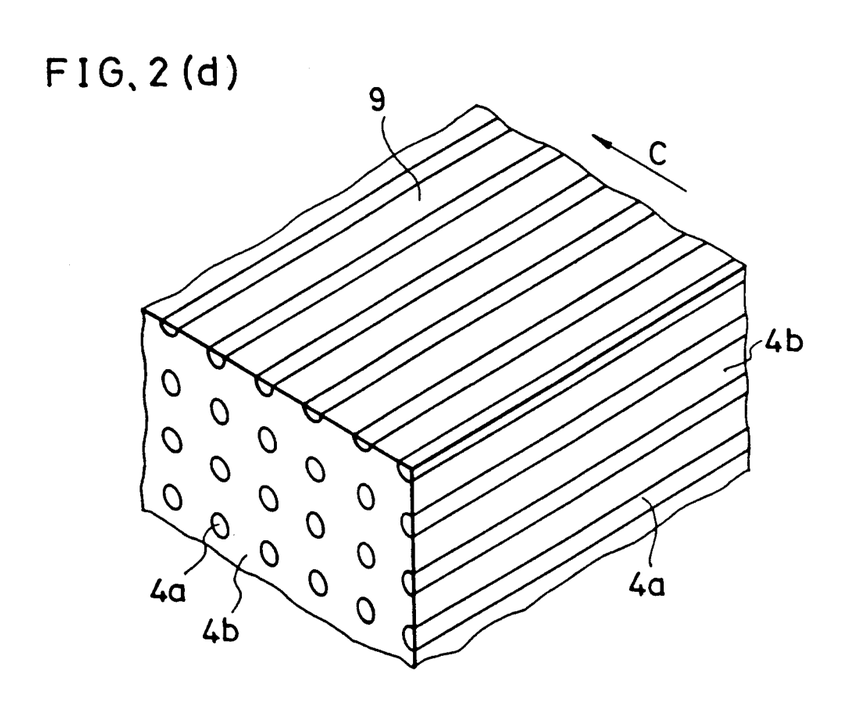

FIG. 2(d) shows still other preferred embodiment of the constitution of the friction member 4 wherein the reinforcing fibers 4a are arranged in a direction substantially vertical to the moving direction of the driven member 3, and circular sections of the reinforcing fibers 4a vertical to the axes thereof are exposed on side surfaces of the friction member 4 which does not contact the vibrating stator 2. When the ultrasonic motor using the friction member 4 shown in FIG. 2(d) is driven, especially in respect of the friction between the reinforcing fibers in the friction member and the vibrating stator, the vibrating stator 2 contacts the reinforcing fibers 4a only at sectional surfaces arranged in a direction vertical to the axes thereof. That is, the reinforcing fibers 4a in the friction member 4 are arranged vertical to the direction of the friction acting to the friction member 4.

Figure 2E:
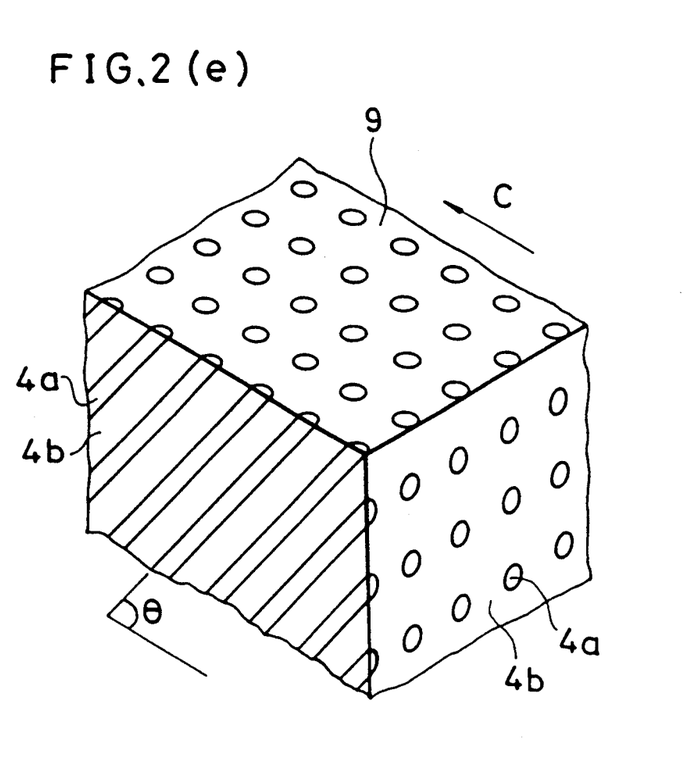

FIG. 2(e) shows still other preferred embodiment of the constitution of the friction member 4 wherein the reinforcing fibers 4a are arranged in a direction taking a predetermined angle $\theta$ to the moving direction of the driven member 3 shown by arrow C. When the ultrasonic motor using the friction member 4 shown in FIG. 2(e) is driven, especially in respect of the friction between the reinforcing fibers in the friction member and the vibrating stator, the vibrating stator 2 contacts only at ellipse sections of the reinforcing fibers 4a taking the angle $\theta$ against the axes thereof. That is, the reinforcing fibers 4a in the friction member 4 are arranged in the direction taking the angle $\theta$ against the direction of the friction acting to the friction member.

In the above-mentioned embodiments shown in FIGS. 2(a) to 2(e), the reinforcing fibers 4a are combined and supported by an organic binder 4b. As a material of the reinforcing fiber 4a, there is no restriction. However, carbon fiber, aromatic polyamide fiber, ceramic fiber, high density polyethylene fiber, glass fiber and the like can be adopted. And especially, the carbon fiber and the aromatic polyamide fiber are suitable.

As a material of the organic binder 4b, there is also no restriction. However, it is desirable to use polyimide resin, polyamideimide resin, bismaleimidetriazine resin, phenol resin and the like. Such materials can be used individually or incorporative.

Details of the embodiments are described in the following.

(A) a group of preferred examples using a friction member wherein the reinforcing fibers are arranged at least one direction parallel to the moving direction of the driven member:

EXAMPLE 1

Figure 3A:
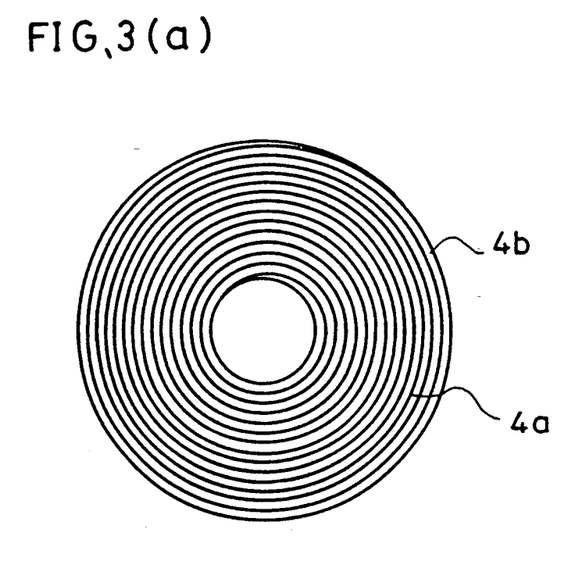
FIG. 3(a) is a cross-sectional top view showing an embodiment of arrangement of reinforcing fibers in the friction member of the ultrasonic motor in accordance with the present invention.

Carbon fiber was used as a material of the reinforcing fiber 4a. An unidirectional prepreg was made by impregnating an unidirectional tape of the carbon fiber (Carbolon tape: NIPPON CARBON CO., LTD.) with the phenol resin. The prepreg was rolled volutedly so as to make lamination for arranging the carbon fibers in circular direction. A volution of the rolled prepreg was cured under conditions of heating and pressurizing in an autoclave. As a result, a cylindrical body was obtained. After that, a ring-shaped friction member A having thickness of 1 mm was cut from the cylindrical body. FIG. 3(a) shows, for example, section of the ring-shaped friction member A. As shown in FIG. 3(a), the ring-shaped friction member A has an arrangement of the carbon fibers continuously voluted in circular direction.

EXAMPLE 2

Figure 3B:
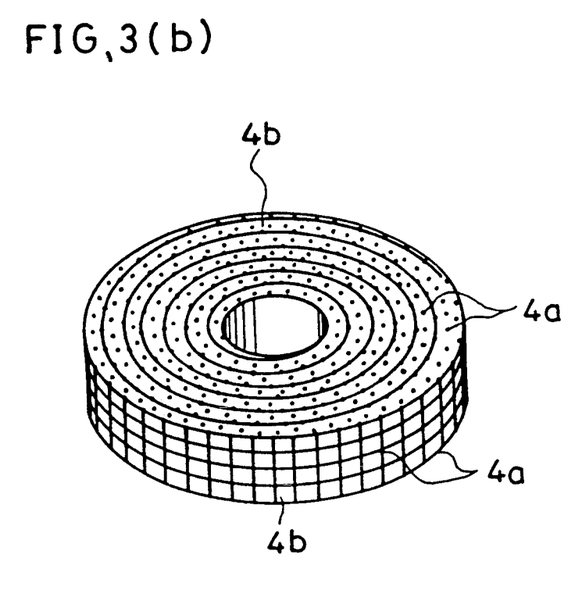
FIG. 3(b) is a perspective view showing another embodiment of arrangement of the reinforcing fibers of the friction member of the ultrasonic motor in accordance with the present invention.

Carbon fiber was used as a material of the reinforcing fiber 4a. A prepreg was made by impregnating a plain fabric cloth of the carbon fiber (BESFIGHT: TOHO RAYON CO., LTD.) with the polyimide resin. The prepreg was rolled volutedly for making lamination and cured under heating and pressurizing in the autoclave. As a result, a cylindrical body was obtained. After that, a ring shaped friction member B having thickness of 1 mm was cut from the cylindrical body. FIG. 3(b) is a perspective view showing, for example, the ring-shaped friction member B. As shown in FIG. 3(b), the ring-shaped friction member B has a set of arrangement of the carbon fibers voluted in circular direction and another set of arrangement of the carbon fibers in which the sections of the carbon fibers are exposed on the surface of the friction member.

EXAMPLE 3

Aromatic polyamide fiber was used as a material of the reinforcing fiber 4a. A filament yarn of the aromatic polyamide fiber (Technora: Teijin Limited) was cylindrically rolled for orienting the aromatic polyamide fiber in circular direction and impregnated with the polyimide resin. After that, a cylindrical body was formed by curing the rolled aromatic polyamide fiber under conditions of heating and pressurizing in the autoclave. Finally, a ring-shaped friction member C having thickness of 1 mm was cut from the cylindrical body. The ring-shaped friction member C which is, for example, shown in FIG. 3(a) has an arrangement of the aromatic polyamide fiber voluted in circular direction.

EXAMPLE 4

Aromatic polyamide fiber was used as a material of the reinforcing fiber 4a. A prepreg was made by impregnating a plain fabric cloth of the aromatic polyamide fiber (Kevler: Du Pont Co., LTD.) with the phenol resin. The prepreg was rolled volutedly for making lamination and cured under conditions of heating and pressurizing in the autoclave. As a result, a cylindrical body was obtained. After that, a ring-shaped friction member D having thickness of 1 mm was cut from the cylindrical body. The ring-shaped friction member D which is, for example, shown in FIG. 3(b) has a set of arrangement of the aromatic polyamide fibers voluted in circular direction and another set of arrangement of the aromatic polyamide fibers in which the sections thereof are exposed on the surface of the friction member.

EXAMPLE 5

Carbon fiber and aromatic polyamide fiber were used as materials of the reinforcing fibers 4a. A prepreg was made by impregnating a hybrid plain fabric cloth weaved the carbon fiber as woof and the aromatic polyamide fiber as warp (Carbon-Kevler hybrid cloth: Kanebo, LTD.) with the polyimide resin. The prepreg was rolled volutedly for making lamination and cured under conditions of heating and pressurizing in the autoclave. As a result, a cylindrical body was obtained. After that a ring-shaped friction member E having thickness of 1 mm was cut from the cylindrical body. The ring-shaped friction member E which is, for example, shown in FIG. 3(b) has a set of arrangement of the aromatic polyamide fibers voluted in circular direction and another set of arrangement of the carbon fibers in which the sections of the carbon fibers are exposed on the surface of the friction member.

EXAMPLE 6

Carbon fiber was used as a material of the reinforcing fiber 4a. An unidirectional prepreg was made by impregnating a bundle of continuous yarns of the carbon fiber (BESFIGHT: TOHO RAYON CO., LTD.) with the bismaleimide-triazine resin (BT 2160: Mitsubishi Gas Chemical Company, Inc.). The prepreg was rolled volutedly for making lamination of voluted carbon fibers in circular direction and cured under heating and pressurizing in the autoclave. As a result, a cylindrical body having 65 Wt % of fiber content was obtained. After that, a ring-shaped friction member H having thickness of 0.5 mm was cut from the cylindrical body. The ring-shaped friction member H which is, for example, shown in FIG. 3(a) has an arrangement of the carbon fibers continuously voluted in circular direction.

EXAMPLE 7

Aromatic polyamide fiber was used as a material of the reinforcing fiber 4a. An unidirectional prepreg was made by impregnating a bundle of continuous yarns of the aromatic polyamide fibers (Kevler: Du Pont Co., LTD.) with the bismaleimide-triazine resin (BT 2160: Mitsubishi Gas Chemical Company, Inc.). The prepreg was rolled volutedly for making lamination of voluted aromatic polyamide fibers in circular direction and cured under heating and pressurizing in the autoclave. As a result, a cylindrical body having 65 Wt % of fiber content was obtained. After that, a ring-shaped friction member I having thickness of 0.5 mm was cut from the cylindrical body. The ring-shaped friction member I which is, for example, shown in FIG. 3(a) has an arrangement of the aromatic polyamide fibers continuously voluted in circular direction.

FIRST EXAMPLE TO BE COMPARED

Carbon fiber was used as a material of the reinforcing fiber 4a. An unidirectional prepreg was made by impregnating a bundle of continuous yarns of the carbon fibers drawn in one direction (BESFIGHT: TOHO RAYON CO., LTD.) with the bismaleimide-triazine resin (BT 2160: Mitsubishi Gas Chemical Company, Inc.). The prepregs were laminated and cured under conditions of heating and pressurizing in the autoclave. As a result, a cylindrical body having 65 Wt % of fiber content was obtained. After that, a ring-shaped friction member J having thickness of 0.5 mm was cut from the cylindrical body. The ring-shaped friction member J which is, for example, shown in FIG. 7 has an arrangement of the carbon fibers in a direction unrelated to the moving direction of the driven member.

Figure 7:
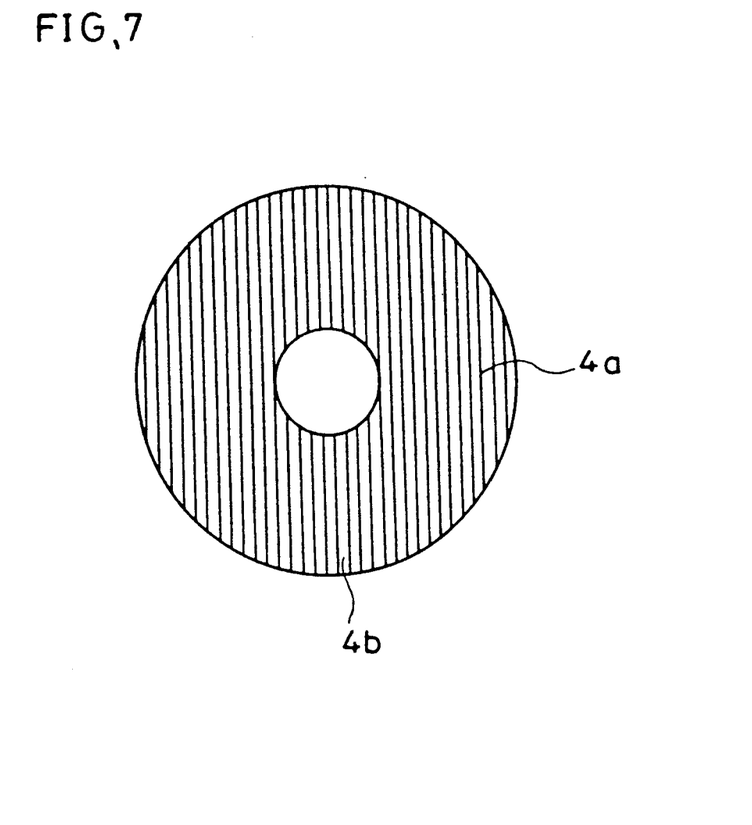
FIG. 7 is a cross-sectional top view showing an example of arrangement of the reinforcing fibers of the friction member for comparing with the above-mentioned embodiments of the present invention.

When an ultrasonic motor using the ring-shaped friction member J as a friction member, friction between the vibrating stator 2 and the reinforcing fibers 4a occurs at angles always different from the axial direction of the fibers 4a, because the reinforcing fibers 4a in the friction member are arranged only in one direction.

SECOND EXAMPLE TO BE COMPARED

Aromatic polyamide fiber was used as a material of the reinforcing fiber 4a. An unidirectional prepreg was made by impregnating a bundle of continuous yarns of the aromatic polyamide fibers drawn in one direction (Kevler: Du Pont Co., LTD.) with the bismaleimide-triazine resin (BT 2160: Mitsubishi Gas Chemical Company, Inc.). The prepregs were laminated and cured under conditions of heating and pressurizing in the autoclave. As a result, a cylindrical body having 65 Wt % of fiber content was obtained. After that, a ring-shaped friction member K having thickness of 0.5 mm was cut from the cylindrical body. The ring-shaped friction member K which is, for example, shown in FIG. 7 has an arrangement of the aromatic polyamide fibers in a direction unrelated to the moving direction of the driven member.

At first, the ring-shaped friction members A-E obtained from the above-mentioned examples 1-5 were adhered on discs made of the stainless steel. Changes of the friction coefficient of each friction members A-E in circular direction on the frictional surface were measured as time passed. The measurement of the friction coefficient was executed by rotating the disc under condition of being contacted with a ball made of stainless steel with a predetermined pressure on the disc on which the above-mentioned friction member was adhered. When the disc was rotared, frictional resistance was occured between the disc and the ball. The value of the friction coefficient was obtained from measurement of the frictional resistance by a frictional resistance tester. Changes of the friction coefficients of the friction members as time passed are shown in table 1.

For comparing the friction coefficients of the friction members in accordance with the present invention, changes of the friction coefficients of other friction members F and G in which the fibers are oriented at random are also shown in the table 1. The friction member F (thickness of 1 mm) was obtained by compressing the kneaded material of carbon fibers which was chopped in 4 mm (40 Wt %) and phenol resin (60 Wt %). The friction member G was obtained by compressing the kneaded material of aromatic polyamide fiber which was chopped in 2mm and polyamide resin.

TABLE 1

| Friction coefficient | Experiment number |  |  |  |  |  |  |
|---|---|---|---|---|---|---|---|
|  | 1 | 2 | 3 | 4 | 5 | 6 | 7 |
|  | Kind of friction members |  |  |  |  |  |  |
|  | A | B | C | D | E | F | G |
| initial value | 0.25 | 0.32 | 0.28 | 0.40 | 0.38 | 0.30 | 0.41 |
| passing 10 min | 0.25 | 0.33 | 0.29 | 0.42 | 0.40 | 0.37 | 0.48 |
| passing 20 min | 0.25 | 0.34 | 0.30 | 0.43 | 0.41 | 0.44 | 0.53 |
| passing 30 min | 0.25 | 0.34 | 0.30 | 0.44 | 0.41 | 0.48 | 0.56 |
| passing 60 min | 0.25 | 0.34 | 0.30 | 0.44 | 0.41 | 0.50 | 0.58 |
| passing 90 min | 0.25 | 0.34 | 0.30 | 0.44 | 0.41 | 0.50 | 0.60 |
| passing 120 min | 0.25 | 0.34 | 0.30 | 0.44 | 0.41 | 0.50 | 0.60 |

As shown in the table 1, the changes of the friction coefficients of the friction members A-E were very small when the friction occurred between the ball made of stainless steel and the friction members in the experiments 1 to 5, because the friction acted in the same direction of the orientation of the fibers. On the other hand, the friction coefficients of the friction members F and G were respectively largely changed as time passed in the experiments 6 and 7, because the fibers were not oriented in any predetermined direction.

Figure 4:
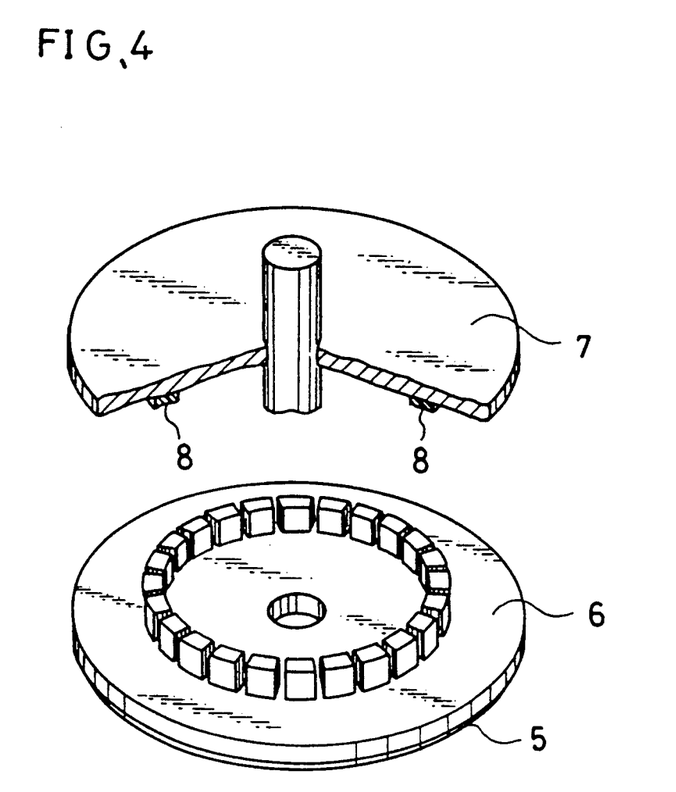
FIG. 4 is a partially broken perspective view showing an ultrasonic motor in accordance with the present invention.

Next, disc-shaped ultrasonic motors, for example, shown in FIG. 4 are constituted with using one of the friction members A, B, C, D and E obtained from the above-mentioned examples 1 to 5. In FIG. 4, numeral 5 indicates a piezoelectric element. A vibrating stator 6 which is made of stainless steel is adhered on a surface of the piezoelectric element 5 by using adhesive. Numeral 7 indicates an driven member made of stainless steel, and a friction member 8 corresponding to one of the friction members A-E is fixed on the driven member 7. Pressure of a spring (not shown in the figure) which is to be applied to the driven member 6 and the vibrating stator 7 is adjusted for making initial braking torque as 500 gf·cm.

In respect of the ultrasonic motors using the friction members A-G, values of the braking torque after cutting off the electric power, re-starting characteristic repeating the switching on and off, resonant frequency, quantities of wear of the vibrating stator and the friction member after driving predetermined time period are measured and shown in table 2.

TABLE 2

| | Experiment number | | | | | | |
|---|---|---|---|---|---|---|---|
| | 8 | 9 | 10 | 11 | 12 | 13 | 14 |
| | Kind of friction members | | | | | | |
| | A | B | C | D | E | F | G |
| Braking torque (gf · cm) | | | | | | | |
| initial value | 500 | 500 | 500 | 500 | 500 | 500 | 500 |
| passing 30 min | 510 | 510 | 520 | 520 | 520 | 800 | 800 |
| passing 1 h | 510 | 520 | 530 | 540 | 530 | 1000 | 1200 |
| passing 2 h | 510 | 520 | 530 | 540 | 530 | 1300 | 1500 |
| passing 24 h | 510 | 520 | 530 | 540 | 530 | 1300 | 1500 |
| Restarting characteristic | | | | | | | |
| initial state | good | good | good | good | good | good | good |
| after passing 24 h | good | good | good | good | good | not good | not good |
| Resonant frequency KHz | | | | | | | |
| initial value | 70.8 | 70.2 | 71.2 | 70.8 | 70.5 | 72.0 | 72.8 |
| after passing 24 h | 71.0 | 70.6 | 71.5 | 71.4 | 70.9 | 74.0 | 74.5 |
| Ware of vibrating stator | | | | | | | |
| after passing 24 h | not observed | below 1 μm | not observed | below 1 μm | below 1 μm | large | large |
| Wear of friction member | | | | | | | |
| after passing 24 h | below 1 μm | below 1 μm | below 1 μm | below 1 μm | below 1 μm | 3 μm | 4 μm |

As it is obvious from table 2, the ultrasonic motors respectively using one of the friction members A and C containing arrangement of the fibers continuously voluted in the same direction as the rotating direction of the driven member, were experimented and shown in the columns of the experiment numbers 8 and 10. In respect of both motors, the change of the braking torque was small as time passed. And also, the change of the resonant frequency of each motor as time passed was small and the restarting characteristic did not show any disadvantage. Furthermore, the wear of the friction member was little and flaw was hardly observed on the vibrating stator which was the other party of the friction member.

The ultrasonic motors respectively using one of the friction members B, D and E containing a set of arrangement of the fibers continuously voluted in substantially the same direction as the rotating direction of the driven member and another set of arrangement of the fibers wherein sections thereof were exposed on the friction surface of the friction member were experimented and shown in the columns of the experiment numbers 9, 11 and 12. In respect of the motors, the flaw was observed a little on the surfaces of the respective vibrating stators. However, wear of the friction members were little and the changes of the breaking torques as time passed were also small. Furthermore, the changes of the resonant frequencies were little and they show any disadvantage of the restarting characteristics.

On the other hand, the ultrasonic motors respectively using one of the friction members F and G containing the fibers disposed at random were experimented and shown in the columns of the experiment numbers 13 and 14. In these cases, the breaking torques of both motors were largely changed and also the resonant frequencies were changed. As a result, the motor sometimes could not restart. Furthermore, the flaws were badly noticed on the vibrating stators and the wear of the friction members were also hard.

Still other disc-type ultrasonic motors, for example, shown in FIG. 4 respectively using one of the friction members H and I made by the above-mentioned examples 6 and 7 were assembled. In the figure, the friction member 8 which was one of the friction member H or I was fixed on the driven member 7 made of the stainless steel.

Table 3 shows characteristics for ultrasonic motors using one of the friction members H, I, J and K respectively. These characteristics are starting torque when the motor was driven, nonloaded rotation number; occurrence of acoustic noise; and depth of wear of the friction member and the vibrating stator after driving ten million times in speed of 250 r.p.m. with loading of 300 gf·cm in opposite direction against the rotating direction are measured.

TABLE 3

| Experiment number | 15 | 16 | 17 | 18 |
|---|---|---|---|---|
| Kind of the friction members | H | I | J | K |
| Starting torque (gf · cm) | 600 | 800 | 600 | 800 |
| Nonloaded rotation number | 700 | 700 | 700 | 700 |
| Acoustic noise | silent | silent | noisy | noisy |
| Wear depth of the friction members ($\mu$m) | 16 | 25 | 50 | 65 |
| Wear depth of the vibrating stator ($\mu$m) | below 1 $\mu$m | below 1 $\mu$m | 5 $\mu$m | 7 $\mu$m |

The ultrasonic motor experiment results in columns 15 and 16 using one of the friction members H and I from Table 3 contain an arrangement of the fibers continuously voluted in the same direction as the rotating direction of the driven member. In both motors, the acoustic noise was not confirmed and high power could be outputted. After driving ten million rotations, the motors showed stable performance, because the quantity of the wear of the friction members and the vibrating stator was very small and reduction of the rotating speed could not be observed during the continuous driving.

On the other hand, the ultrasonic motor experiment results 17 and 18 use one of the friction members J and K containing the fibers arranged in a direction unrelated to the moving direction of the driven member. In both of these motors, occurrence of the acoustic noise was confirmed, change in the rotating speed during the continuous driving was observed. Namely, the rotating speed of the motor using the friction member J was reduced to 180 r.p.m. and that of the motor using the friction member K was reduced to 150 r.p.m. after rotating ten million times. Furthermore, the wear of the friction members and the vibrating stator after rotating ten million times was noticeable.

As mentioned above, the ultrasonic motor in accordance with the present invention is used the friction member having arrangement of the fibers oriented in at least substantially the same direction as the moving direction of the driven member and disposed between the driven member and the vibrating stator which generates travelling waves by piezoelectric effect of the piezoelectric element. Namely, the reinforcing fibers in the friction members are uniformly arranged against the moving direction of the driven member. Therefore, even if the wear of the friction member proceeds, irregularily of the fibers hardly occurs on the surface of the friction member and the uniform frictional contact can be maintained. At the same time, the fibers hardly damage the surface of the vibrating stator.

Furthermore, the wear of the friction member and the vibrating stator is essentially small and the change of the braking torque as tine passed also reduced. Still more, the change of the resonant frequency of the vibrating stator as time passed also reduced and the stable starting up in motor is maintained. As a result, the reliability of the ultrasonic motor extending over a long period of time is improved.

(B) another group of preferred examples using a friction member in which reinforcing fibers are arranged vertical to the moving direction of the driven member:

EXAMPLE 8

Figure 5A:
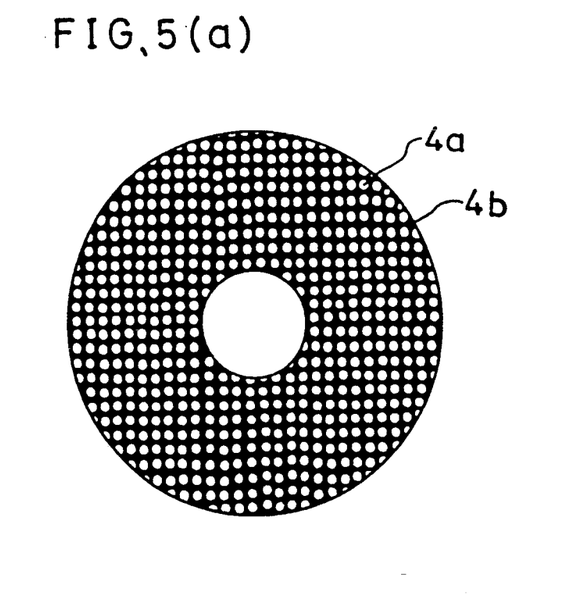
FIGS. 5(a) and 5(b) are respectively cross-sectional top views showing still other embodiments of arrangement of the reinforcing fibers of the friction member in accordance with the present invention.

Carbon fiber was used as a material of the reinforce fiber 4a. A prepreg was made by impregnating an unidirectional tape of the carbon fiber (Carbolon tape: NIPPON CARBON CO., LTD.) with the phenol resin (Milex: MITSUI TOATSU CHEMICALS, INC.). The prepreg was rolled volutedly so as to arrange the carbon fibers in a direction parallel to the axial direction of the rolled prepreg. A cylindrical body having 70 Wt % of fiber content was obtained by curing the rolled prepreg under conditions of heating and pressuring in the autoclave. After that, a ring-shaped friction member L having thickness of 0.5 mm was cut from the cylindrical body. The ring-shaped friction member L, for example, shown in FIG. 5(a) has an arrangement of the carbon fibers, wherein sections thereof are exposed on the surface of the friction member.

EXAMPLE 9

Aromatic polyamide fiber was used as a material of the reinforcing fiber 4a. A prepreg was made by impregnating a bundle of continuous yarns of the aromatic polyamide fibers drawn in unidirection (Kevler: Du Pont Co., LTD.) with the phenol resin (Milex: MITSUI TOATSU CHEMICALS, INC.). The prepreg was rolled volutedly so as to arrange the aromatic polyamide fibers in axial direction of the rolled prepreg. A cylindrical body having 70 Wt % of fiber content was obtained by curing the rolled prepreg under conditions of heating and pressuring in the autoclave. After that, a ring-shaped friction member M having thickness of 0.5 mm was cut from the cylindrical body. The ring-shaped friction member M, for example, shown in FIG. 5(a) has an arrangement of the aromatic polyamide fibers, wherein sections thereof are exposed on the surface of the friction member.

EXAMPLE 10

Figure 5B:
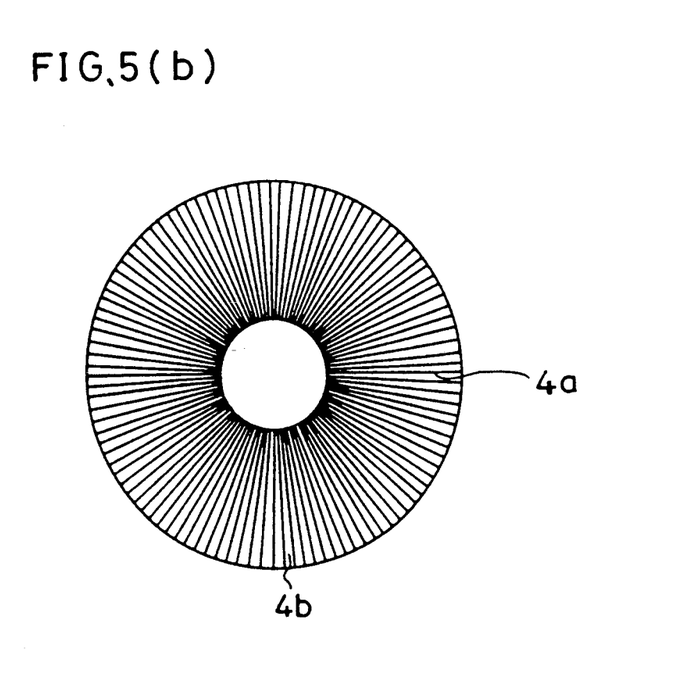

Carbon fiber was used as a material of the reinforcing fiber 4a. A continuous yarn of the carbon fiber (BESFIGHT: TOHO RAYON CO., LTD.) was impregnated with the polyimido resin (Kerimid: Rhone-Poulenc Co., Ltd.). After disposing the yarn radially in a die set, a cylindrical body having 70 wt % of fiber content was obtained by molding under conditions of heating and pressuring. Next, a ring-shaped friction member N having thickness of 0.5 mm was cut from the cylinderical body. The ring-shaped friction member N, for example, shown in FIG. 5(b) has radially disposed arrangement of the carbon.

Still other disc-type ultrasonic motors, for example, shown in FIG. 4 respectively using one of the friction members L, M and N made from the above-mentioned examples 8, 9 and 10 were assembled. In the figure, the friction member 8 which was one of the friction members L, M and N was fixed on the driven member 7 made of stainless steel. In respect of the ultrasonic motors respectively using one of the friction members L, M and N, starting torque when the motor was driven, nonloaded rotation number, occurrence of acoustic noise, and quantities of wear of the friction member and the vibrating stator after driving ten million times in speed of 250 r.p.m. with loading of 300 gf·cm in opposite direction against the rotating direction, are shown in table 4.

TABLE 4

| Experiment number | 19 | 20 | 21 |
|---|---|---|---|
| Kind of the friction members | L | M | N |
| Starting torque (gf · cm) | 700 | 900 | 600 |
| Nonloaded rotation number | 800 | 800 | 700 |
| Acoustic noise | silent | silent | silent |
| Wear depth of friction member (μm) | 8 | 15 | 12 |
| Wear depth of vibrating stator (μm) | below 1 μm | below 1 μm | below 1 μm |

As it is obvious from table 4, the ultrasonic motors for experiments 19, 20 and 21 using one of the friction members L, M and N respectively, contain an arrangment of fiber continuously oriented in a direction vertical to the rotating direction of the driven member. For each motor acoustic noise was not confirmed and high power could be outputted. After driving ten million times of rotation, the motors showed stable performance because quantity of the wear of the friction members and the vibrating stator were very small and reduction of the rotating speed could not be observed during the continuous driving.

EXAMPLE TO BE COMPARED

As a comparison example to the above mentioned friction members in accordance with the present invention, a disc-type ultrasonic motor was assembled similar to the above-mentioned examples, for example, shown in FIG. 4. The ultrasonic motor uses a friction member (having thickness of 1 mm) made by molding of a composition of asbestos fiber and the phenol resin under conditions of heating and pressurizing. The above-mentioned material was conventionally used as lining material of a clutch because of having large friction coefficient.

When the disc-type ultrasonic motor was driven, starting torque of 800 gf·cm and nonloaded rotation number 800 r.p.m. could be gained. However, occurence of the acoustic noise was confirmed during the driving.

And also, the ultrasonic motor was driven at first in rotation speed of 250 r.p.m with loading of 300 gf·cm, the rotation speed gradually reduced as time passed. Such an ultrasonic motor could not be put to the practical use.

Furthermore, when the wear depth of the friction member after rotating one million times was measured, the friction member was worn out as 85 μm. The values of the starting torque and the nonloaded rotation number were respectively reduced from the initial values. And also, when the wear depth of the vibrating stator made of the stainless steel which was the other party of the friction member was measured, irregurarity and partial flaws of the surface of the vibrating stator were observed and the surface was worn out about 8 μm in average.

As mentioned above, the ultrasonic motor in accordance with the present invention uses the friction member having arrangement of the fibers oriented at least a direction vertical to the moving direction of the driven member and disposed between the driven member and the vibrating stator which generates traveling waves by vibration of the piezoelectric element. Namely, the reinforcing fibers in the friction members are uniformly arranged against the moving direction of the driven member. Therefore, even if the wear of the friction member proceeds, irregurarity of the fibers hardly occurs on the surface of the friction member and the uniform frictional contact can be maintained. At the same time, the fiber hardly damages the surface of the vibrating stator.

Furthermore, the wear of the friction member was essentially very small even if the ultrasonic motor was driven in long time period. And the characteristics of the ultrasonic motor was hardly deteriorated even when the ultrasonic motor was driven in long time period. As a result, a reliable and silent ultrasonic motor was obtained.

(C) Still other preferred example using a friction member in which the reinforcing fibers are arranged in a direction having an angle against the moving direction of the driven member:

Example 11

Figure 6:
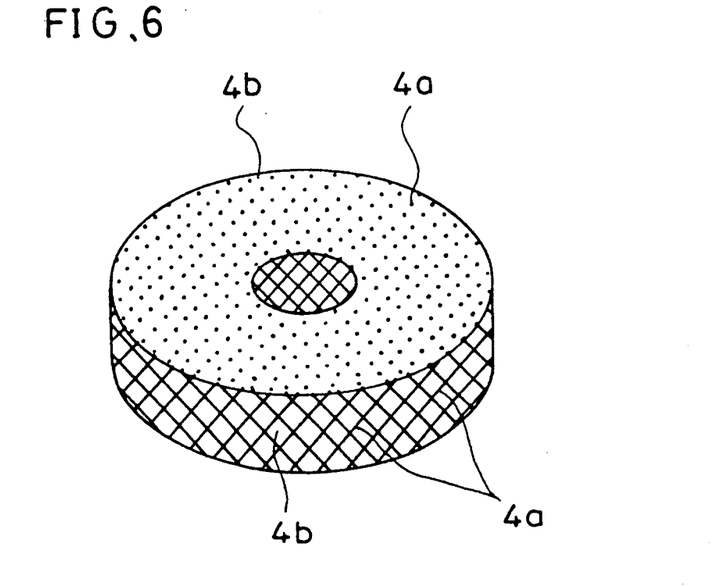
FIG. 6 is a perspective view showing still other embodiment of arrangement of the reinforcing fibers of the friction member in accordance with the present invention.

Aromatic polyamide fiber was used as a material of the reinforcing fiber 4a. A prepreg was made by impregnating a plain fabric cloth of the aromatic polyamide fiber (Kevler: Du Pont Co., Ltd. ) with rubber denaturated phenol resin (Milex: MITSUI TOATSU CHEMICALS, INC.). The prepreg was cut into plural tapes in which the fibers were oriented in a direction with taking 45 degree against the cutting surface. After that, the tapes were rolled volutedly and cured under conditions of heating and pressurizing in the autoclave. As a result, a cylindrical body having 60 Wt % of fiber content was obtained. Next, a ring-shaped friction member having thickness of 1.0 mm was cut down from the cylindrical body. The ring-shaped friction member as shown in FIG. 6 has an arrangement of the aromatic polyamide fiber taking 45 degree against the frictional surface.

Still other disc-type ultrasonic motor, for example, shown in FIG. 4 using such a friction member was assembled.

When the disc-type ultrasonic motor was driven, occurence of the acoustic noise was not confirmed, and a large starting torque of of 900 gf·cm and nonloaded rotation number 800 r.p.m. could be gained.

And also, when the ultrasonic motor was driven in rotation speed of 250 r.p.m. with loading of 300 gf·cm in opposite direction of the rotating direction, the rotation speed of the motor were not reduced as time passed and the motor showed stable performance after driving rotation of ten million times.

Furthermore, when the wear depth of the friction member was measured after rotating ten million times, worn out quantity of the friction member was very few as depth of 21 $\mu$m. The values of the starting torque and the nonloaded rotation number hardly changed from the initial values after rotating ten million times. And also, when the wear depth of the vibrating stator made of the stainless steel which was the other party of the friction member was measured, the value of the wear depth was below 1 $\mu$m. Namely, the vibrating stator was hardly worn out.

As mentioned above, the ultrasonic motor in accordance with the present invention uses the friction member having arrangement of the fibers oriented at least a direction taking an angle of 45 degree against the moving direction of the driven member and disposed between the driven member and the vibrating stator which generates travelling waves by vibration of the piezoelectric element. Namely, the reinforcing fibers in the friction members are uniformly arranged against the moving direction of the driven member. Therefore, even if the wear of the friction member proceeds, iregurarity of the fibers hardly occurs on the surface of the friction member and the uniform frictional contact can be maintained. At the same time, the fiber hardly damages the surface of the vibrating stator.

Furthermore, the wear of the friction member was essentially very small even if the ultrasonic motor was driven in long time period. And the characteristics of the ultrasonic motor was hardly deteriorated even when the ultrasonic motor was driven in long time period. As a result, a reliable and silent ultrasonic motor could be obtained.

Although the invention has been described in its preferred from with a certain degree of particularity, it is understood that the present disclosure of the preferred form has been changed in the details of construction and the combination and arrangement of parts may be resorted to without departing from the spirit and the scope of the invention as hereinafter claimed.

What is claimed is

1. An ultrasonic motor comprising:
   a piezoelectric element;
   a vibrating stator provided on said piezoelectric element for generating traveling waves;
   a driven member; and
   a friction member disposed between said vibrating stator and said driven member, said friction member comprising reinforcing fibers, all of said reinforcing fibers being arranged in unidirection substantially perpendicular to a moving direction of said driven member.

2. An ultrasonic motor comprising:
   a piezoelectric element;
   a vibrating stator provided on said piezoelectric element for generating traveling waves;
   a driven member; and
   a friction member disposed between said vibrating stator and said driven member, said friction member comprising reinforcing fibers, all of said reinforcing fibers being arranged unidirectionally at a predetermined angle with respect to a moving direction of said driven member.

* * * * *

UNITED STATES PATENT AND TRADEMARK OFFICE
CERTIFICATE OF CORRECTION

PATENT NO. : 5,059,849

DATED : October 22, 1991

INVENTOR(S) : SUMIHARA, et al.

It is certified that error appears in the above-identified patent and that said Letters Patent is hereby corrected as shown below:

On the title page, Item
[73] Assignee: Matsushita Electric Industrial Co., Ltd., Kadoma, Japan Signed and Sealed this Fourteenth Day of June, 1994

*Attest:*

BRUCE LEHMAN

*Attesting Officer*  *Commissioner of Patents and Trademarks*